(12) United States Patent
Bischoff

(10) Patent No.: US 9,554,509 B2
(45) Date of Patent: Jan. 31, 2017

(54) AGRICULTURAL HARVESTING MACHINE WITH AN EXCHANGEABLE CROP PROCESSING ELEMENT

(71) Applicant: Deere & Company, Moline, IL (US)

(72) Inventor: Lutz Bischoff, Nuenschweiler (DE)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 14/862,231

(22) Filed: Sep. 23, 2015

(65) Prior Publication Data

US 2016/0088793 A1 Mar. 31, 2016

(30) Foreign Application Priority Data

Sep. 26, 2014 (DE) .................. 10 2014 219 586

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *A01D 41/127* | (2006.01) | |
| *A01F 12/58* | (2006.01) | |

(52) U.S. Cl.
CPC ............ *A01D 41/127* (2013.01); *A01F 12/58* (2013.01)

(58) Field of Classification Search
CPC .. G06K 19/0723; G06F 11/3065; G06F 13/10; G06F 17/40; G06F 19/00; G05B 19/4063; A01D 41/127
USPC .............................. 701/50; 702/185; 340/438
See application file for complete search history.

(56) References Cited

U.S. PATENT DOCUMENTS

| 6,840,445 | B2 | 1/2005 | Gatz | |
| 7,079,982 | B2* | 7/2006 | Ogura | E02F 9/205 |
| | | | | 701/1 |
| 8,209,076 | B2* | 6/2012 | Boss | G06Q 10/20 |
| | | | | 340/568.1 |

(Continued)

FOREIGN PATENT DOCUMENTS

| DE | 19804740 A1 | 8/1999 |
| DE | 19949994 A1 | 4/2001 |

(Continued)

OTHER PUBLICATIONS

Research & Innovation Vortag Mobile Servicewelten Hagen. Datasheet [online]. Infoman AG, 2009 [retrieved on Sep. 14, 2015]. Retrieved from the Internet: <URL: http://www.simobit.de/documents/Goertz__MSW__Hagen__03062009.pdf>.

(Continued)

*Primary Examiner* — Árpád Fábián-Kovács

(57) ABSTRACT

An agricultural harvesting machine comprises an exchangeable crop processing element, which is installed in the interior of the harvesting machine and which is available in different variants, an electronic control unit, which is connected with a data bank in which data concerning the crop processing element are stored, and a reading device, which is set up to interact with an identification element placed on the crop processing element and to transmit an output signal to the control device that clearly identifies the crop processing element during or after an incorporation of a crop processing element into the harvesting machine; with the aid of the signal, the control unit updates the data bank.

9 Claims, 2 Drawing Sheets

(56) References Cited

U.S. PATENT DOCUMENTS

| | | | | |
|---|---|---|---|---|
| 8,395,486 | B2* | 3/2013 | Sajadi | H04M 1/7253 |
| | | | | 340/10.4 |
| 8,600,627 | B2* | 12/2013 | Beck | A01D 41/127 |
| | | | | 701/29.1 |
| 9,117,128 | B2* | 8/2015 | Mats | G06K 7/10366 |
| 9,269,200 | B2* | 2/2016 | Schmidt | G07C 5/008 |
| 2002/0107624 | A1* | 8/2002 | Rutz | A01B 63/00 |
| | | | | 701/50 |
| 2005/0035852 | A1* | 2/2005 | Paulsen | G07C 5/085 |
| | | | | 340/438 |
| 2009/0107349 | A1* | 4/2009 | Noonan | A01F 15/071 |
| | | | | 100/14 |
| 2014/0250854 | A1 | 9/2014 | Wendte | |
| 2014/0277960 | A1 | 9/2014 | Blank et al. | |

FOREIGN PATENT DOCUMENTS

| | | |
|---|---|---|
| DE | 10204076 A1 | 9/2002 |
| DE | 102007034167 A1 | 1/2009 |
| DE | 102009046821 A1 | 5/2011 |
| EP | 1564688 A1 | 8/2005 |

OTHER PUBLICATIONS

Battery-Free NFC/RFID Memory Applications Get Quick Start with Energy-Harvesting Discovery Kit from STMicroelectronics. Nov. 12, 2012 [online], [retrieved on Sep. 14, 2015]. Retrieved from the Internet <URL: http://www.st.com/web/en/press/en/p3356>.
European Search Report in foreign counterpart application No. 15182103.0 dated Feb. 8, 2016 (7 pages).

* cited by examiner

AGRICULTURAL HARVESTING MACHINE WITH AN EXCHANGEABLE CROP PROCESSING ELEMENT

CROSS-REFERENCE TO RELATED APPLICATIONS

Pursuant to 35 USC §119, this application claims the benefit of and priority to German patent application no. 102014219586.1, filed on Sep. 26, 2014, which is herein incorporated by reference in its entirety.

TECHNICAL FIELD

The invention concerns an agricultural harvesting machine.

BACKGROUND

Nowadays, agricultural harvesting machines, such as field choppers and, in particular, combine harvesters, are relatively complex machines with a large number of operating parameters, which are set at suitable values so as to attain an approximately optimal operating result in the harvesting process. From the state of the art, systems are known that are connected with sensors for the determination of crop characteristics and/or results of processes that are taking place in the harvesting machine, and that monitor whether the machine is working in an orderly manner and/or automatically determine optimized operating parameters and, by controlling actuators, automatically set them or display them to the operator, who can then set them.

Such systems, however, also require data regarding the configuration of the individual harvesting machine since, without knowing, for example, how many chopper blades are distributed around the circumference of the chopper drum of a field chopper, an automatic specification of a feed roller rotational speed to attain a desired cutting length is not possible.

Analogously, for the automatic setting of operating parameters of a cleaning device of a combine harvester, it is necessary that data regarding the type and size of the cleaning device be available.

In many cases, an operator contacts a support service on the phone in order to be advised when taking care of problems while harvesting. Here, too, information regarding the configuration of the harvesting machine is required so as to be able to make substantiated statements, but the information is often not available to the operator or the support service.

In the state of the art, solutions are described in which the configuration of elements of the harvesting machine is determined by sensors that interact with the elements and, for example, determine the number of the chopper blades of a chopper drum of a field chopper with the aid of vibrations arising during rotation (DE 10 2009 046 821 A1).

Furthermore, the proposal has been made to equip the control unit with a data bank, into which data regarding the configuration of the harvesting machine are entered by the factory during production. In the case of a reconstruction of the harvesting machine, the data are updated by the workshop personnel in a manner that was not described in more detail (EP 1 564 688 A1).

Furthermore, DE 199 49 994 A1 describes an active measurement value determining device, which is equipped with its own power supply and which is also equipped with a storage device for identification data and a transponder. The identification data can identify a component, a component group, or an apparatus on which the measurement value determining device has been placed. The identification data are recorded by a reading device of a carrier vehicle (which can be, for example, a tractor or a chopper), on which the assembly with the measurement value determining device has been placed, and are sent to its control electronics so that the activities needed for the adaptation are automatically triggered by the control electronics of the carrier vehicle.

An identification of a cultivation device of a tractor by means of an RFID chip, affixed to the cultivation device, and a reading device of the tractor is described in DE 10 2007 034 167 A1.

In the presentation "Mobile service worlds in the international service of machine and plant construction" by M. Goertz, found on Sep. 24, 2014 at the internet address http://www.simobit.de/documents/Goertz_MSW_Hagen_03062009.pdf, an identification of components of stationary machines by RFID labels is described, but it is also mentioned that under certain circumstances, among other things as a result of coverings, such labels cannot be read from the outside.

SUMMARY

Whereas in some cases, a determination of the configuration of a specific component by an assigned sensor and in accordance to DE 10 2009 046 821 A1 appears to be absolutely sensible, it would be very expensive to make available assigned sensors for all exchangeable components of a harvesting machine. With a manual updating of a data bank of the harvesting machine in accordance with EP 1 564 688 A1, there is the danger that needed entries are inadvertently not made or are not correctly made.

The arrangement equipped with a separate power supply of the identification device in accordance with DE 199 49 994 A1 and the one according to DE 10 2007 034 167 A1 are provided for cultivation devices, that is, in the case of harvesting machines, corresponding harvesting attachments, and not for crop processing elements incorporated in the interior of the harvesting machine. This problem is also valid for the stationary machines according to the presentation by M. Goertz.

The invention under consideration has, as its goal, to make available an agricultural harvesting machine that does not have the aforementioned disadvantages or has them to a reduced extent.

The invention under consideration is defined by the claims.

An agricultural harvesting machine comprises at least one crop processing element, which is installed in the interior of the harvesting machine, is exchangeable, and is available in different variants, and an electronic control unit, which is connected with a data bank in which data concerning the crop processing element incorporated in the interior of the harvesting machine are deposited. The control unit is set up to produce output signals based on the data. A reading device, connected with the control unit, is set up to interact with an identification element that has been placed on the crop processing element and to transmit an output signal clearly identifying the crop processing element to the control device, with whose aid the control unit updates the data bank during or after an incorporation of a crop processing element into the harvesting machine.

In this way, the crop processing element is automatically recognized with the aid of a passive (that is, not equipped with its own power source) or active (provided with a power source, for example, a nonrechargeable battery or a rechargeable battery or with so-called energy harvesting means, which convert movements or vibrations or light or other electromagnetic waves into electrical energy—see http://www.itsoc.org/conferences/past-schools/na-school-2009/poster-repository/Ago-13-FabioIannello-POSTER.pdf or http://www.st.com/web/en/press/en/p3356) identification element, which is read by a reading device during the incorporation into the harvesting machine or subsequently thereto. With the aid of the output signals of the reading device (which clearly identifies the identification element and thus the crop processing element), the control device updates the data bank and can then take current data from there, with which it is then ensured that they concern the incorporated crop processing element. These data can be an article number or other clear identification data of the crop processing element or can concern other (in particular, mechanical) characteristics of the crop processing element.

In particular, the control unit is set up to monitor the operating state of the harvesting machine and/or it is used for the automatic adjustment of an operating parameter of the harvesting machine. In this regard, it is connected with a sensor for the determination of an operating value of the harvesting machine and/or a sensor for the determination of a crop characteristic and/or a sensor for the determination of a result of a crop processing taking place in the harvesting machine, and it can be operated to produce monitoring signals regarding the operating state of the harvesting machine and/or control signals for the setting of an operating parameter of the harvesting machine on the basis of the data and the signals of the sensor.

With the data bank, updated by means of the reading device, there is the possibility of adapting preliminary settings of operating parameters to the individual crop processing element, or of using different connections (ratios) between actuator positions and corresponding settings (for example, openings) of the crop processing elements. A (remote) diagnosis with problems or disturbances can also be carried out in a substantially easier manner if it is precisely known which crop processing elements are used in the harvesting machine, which is also valid for the (remote) monitoring of operator settings and corresponding harvesting results. In this regard, there is also the possibility of merely sending the information made available by the reading device to the current configuration of the harvesting machine (that is, the information derived from the output signals of the reading device with regard to the incorporated crop processing elements, such as part numbers) wirelessly to a remote site (for example, a teleservice), so that the technician there can advise the operator of the harvesting machine, by phone, with the elimination of any problems, since it is based on the concrete configuration of the harvesting machine. Also, in this way, spare parts can be made available more easily.

The identification element can be a label with an optically identifiable marking, such as a barcode or a QR code. The reading device works optically with this embodiment, for example, with a camera or a laser scanner. The reading device is particularly easy to hold and to use as a classic scanner, as is used at cash registers, or made as a smart phone with a camera that works wirelessly, together with the control.

Alternatively or additionally, the crop processing element, as an identification element, can be provided with an electromagnetically readable data carrier, such as an RFID chip. In this embodiment, the reading device works electromagnetically, for example, via close range communication.

The reading device can be placed in the area of an opening of an outside shell of the harvesting machine, through which the crop processing machine can be dismantled from the harvesting machine or incorporated into it. There is also the possibility that the reading device is placed without an outer shell of the harvesting machine and/or that the reading device is set up to recognize if a crop processing element is brought to the harvesting machine or removed from it.

The identifiable characteristics of the crop processing element can be the type of a threshing concave, separating basket, cleaning screen, straw shredder, or straw spreader for a combine harvester. The crop processing element can work together directly with the crop, as the aforementioned crop processing elements, or it can also be an element that effects the drive and/or an adjustment of a crop processing element working together with the crop and thus working together indirectly with the crop.

BRIEF DESCRIPTION OF THE DRAWINGS

The detailed description of the drawings refers to the accompanying figures in which.

DETAILED DESCRIPTION OF THE DRAWINGS

Figure 1:
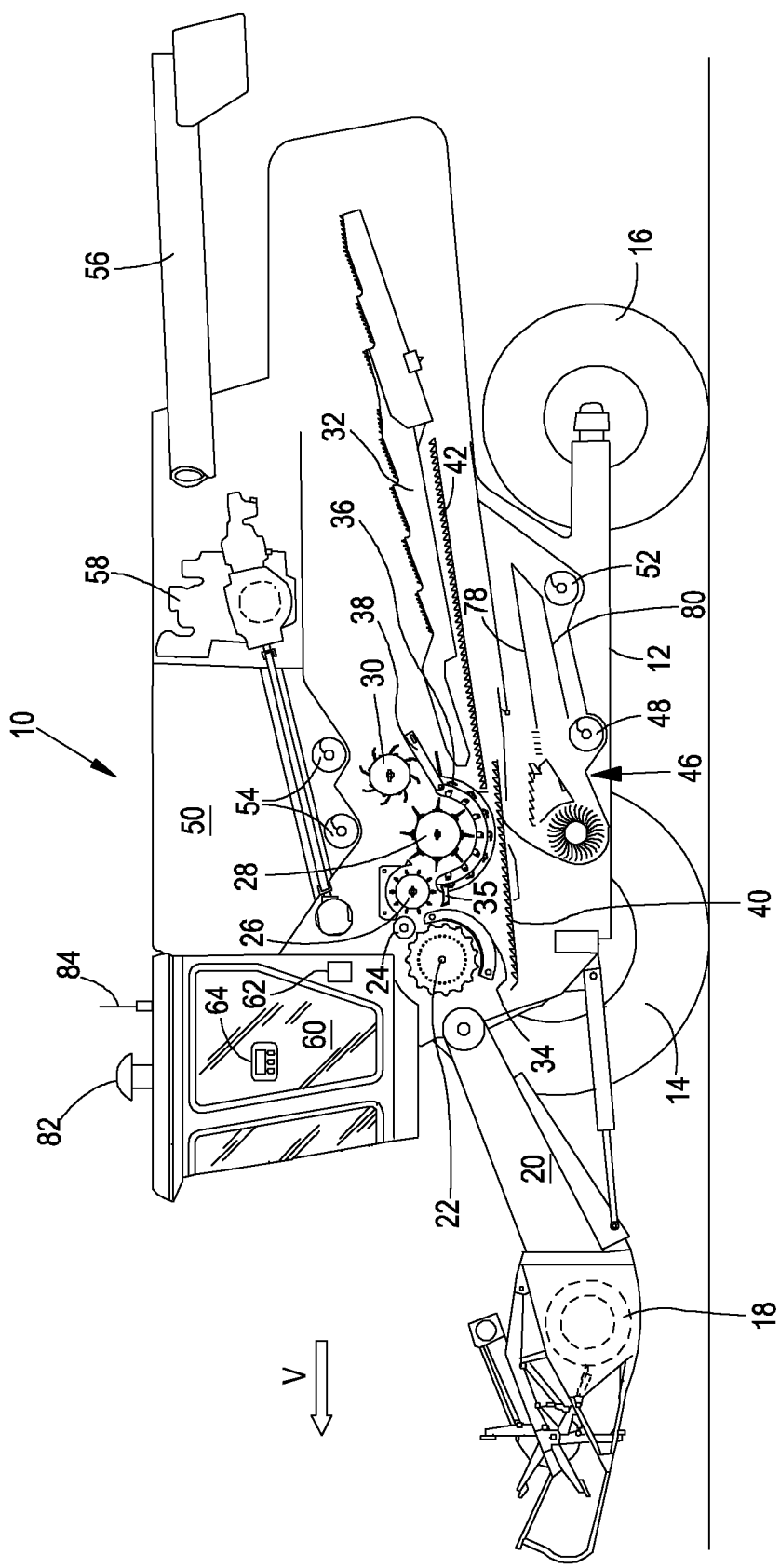
FIG. 1 schematically illustrates a harvesting machine, which has a control unit and several crop processing elements.

FIG. 1 shows a self-propelled harvesting machine 10 in the form of a combine thresher with a frame 12, which is supported on the ground on driven front wheels 14 and steerable rear wheels 16 and is moved forward by them. The wheels 14 are made to rotate by means of driving means, not shown, so as to move the harvesting machine 10, for example, over a field that is to be harvested. In the following, direction indications, such as front and back, refer to the travelling direction V of the harvesting machine 10 while harvesting.

A crop harvesting device 18, in the form of a cutting mechanism, is connected in a removable manner to the front end area of the harvesting machine 10 so as to pick crops, in the form of cereals or other grains that can be threshed, from the field during the harvest and to conduct them upward and backward, by an inclined conveyor 20, to a multi-drum thresher, which comprises a threshing drum 22, a stripping drum 24, an conveying drum 26, working from above, a tangential separator 28, and a spiral drum 30, arranged one after the other in the travelling direction V. Downstream from the spiral drum 30, there is a straw shaker 32. The threshing drum 22 is surrounded, in its lower and rear areas, by a threshing concave 34. Below the conveying drum 26, there is a cover 44 that is closed or provided with openings, whereas above the conveying drum 26, there is a fixed cover, and below the tangential separator 28, there is a separating basket 36 with adjustable finger elements. Below the spiral drum 30, there is a finger rake 38.

The mixture containing grains and impurities passing through the threshing concave 34, the separating basket 36, and the straw shaker 32 arrives via conveying bottoms 40, 42 at a cleaning device 46 with an upper screen 78 and a lower screen 80. Cereal cleaned by the cleaning device 46 is conducted by means of a grain auger 48 to an elevator, not shown, which conveys it to a grain tank 50. A return augur 52 sends unthreshed ear parts back to the threshing process by means of another elevator, not shown. The chaff can be ejected on the back side of the screen device by a rotating chaff spreader, or it is discharged by a straw chopper (not shown), arranged downstream from the straw shaker 32. The cleaned cereal from the grain tank 50 can be unloaded by an unloading system with transverse augurs 54 and an unloading conveyor 56.

The aforementioned systems are driven by means of a combustion engine 58 and controlled and guided from a driver's cabin 60 by an operator. The different devices for threshing, conveying, cleaning, and separating are found within the frame 12. Outside the frame 12, there is an outer shell, which can be folded for the most part. It should be noted that the multi-drum thresher shown here is only an embodiment example. It could also be replaced by a single transverse threshing drum and a subordinate separating device with a straw shaker or one or more separating rotors.

Figure 2:
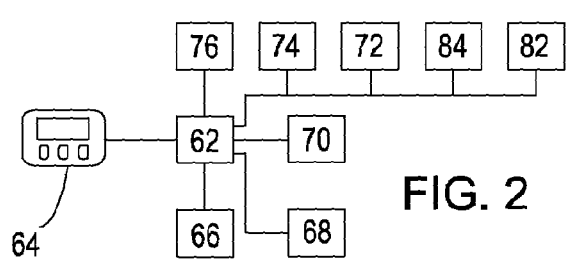
FIG. 2 shows a scheme of the control unit and the sensors of the harvesting machine that are connected with it.

The harvesting machine 10 is equipped with an electronic control unit 62, which is shown schematically in FIG. 2. The control unit 62 comprises, in a manner which is in fact known, a processor and storage units, and is connected with an operator interface 64, which has a display device and input devices.

Furthermore, the control unit 62 is connected with a data bank 66, in which data regarding one or more characteristics of one or more crop processing elements incorporated into the harvesting machine 10 are stored. These data can concern, for example, one or more of the following exchangeable crop processing elements, which are available in different variants: the threshing drum 22, the threshing concave 34, the separating basket 36, the upper screen 78, and/or the lower screen 80. The data correspond to specific parameters of the crop processing elements, such as opening sizes or other dimensions, or are merely used for the identification of the crop processing element for remote consultation purposes of the operator and are sent to a distant site via a communication interface 84 when necessary. The data needed by the control unit 62 can be read by the control unit 62 via a reading means 68 from the data bank 66 with the aid of a unique article number or other identification features of the crop processing element, or (especially if a specific article number is not present in the data bank 66) can demand the data, via the wireless communication interface 84, from another remote data bank (not shown), which is retained and updated, for example, by the manufacturer of the harvesting machine 10, and store them in the data bank 66.

The control unit 62 is, moreover, connected with the reading device 68, which is explained in more detail further below. Furthermore, the control unit 62 is connected with one or more actuators 70, which can adjust, among other things, operating parameters of the harvesting machine 10, such as the rotational speed of the threshing drum 22, the threshing slot size between the threshing drum 22 and the threshing concave 34, the rotational speed of the blower of the cleaning device 46, and/or the opening widths of the upper and/or lower screens 78, 80. Also, the control unit 62 is connected with a sensor 72 for the determination of an operating value of the harvesting machine 10, for example, the threshing drum rotational speed or the position of an actuator 70 for the adjustment of the opening width of the upper and/or the lower screens 78, 80, a sensor 74 for the determination of a crop characteristic, for example, the crop moisture, and a sensor 76 for the determination of a result of a crop processing activity taking place in the harvesting machine, for example, the losses of the straw shaker 32 or the cleaning device 46, and a position determining system 82.

The control unit 62 is used as a control system during the operation of the harvesting machine 10 so as to monitor the operating state of the harvesting machine 10 and/or to suggest, via the operator interface 64, one or more operating parameters of the harvesting machine 10 to the operator, who himself can then set them, or which are automatically set via the actuators 70. The monitoring of the operating state of the harvesting machine 10 can mean, on the one hand, the monitoring of the individual components of the harvesting machine for possible damage (see EP 1 564 688 A1) and perhaps the emitting of an error signal as a monitoring signal; on the other hand, it can be determined whether the harvesting operation is taking place in an optimal manner or whether adjustments brought about by the operator are worthy of improvement and whether corresponding data are displayed as a monitoring signal, via the communication interface 84, on the display device of the operator interface 64, and/or are sent to a remote site (see, for example, DE 102 04 076 A1). The preparation of control signals for the adjustment of an operating parameter of the harvesting machine 10 so as to offer a suggestion (on the display device of the operator interface 64) or the automatic adjustment of the operating parameters (by the actuators 70) is based, in a known manner, on the signals of the sensors 72, 74, and 76, wherein, for example, parameters for the actuators 70 are derived from experience values with the aid of harvesting characteristics (which can be determined by the sensor 74), and the signals of the sensors 76 and 72 serve as feedback values, and additional operator inputs can be used in a supplementary manner, for example, for the satisfaction of the operator, with specific results from the harvesting operation. To this end, for example, reference is made to the disclosures from US 2014/0277960 A1 and the documents cited there, which are included by reference in the documents under consideration.

For this/these task(s), the control unit 62 needs the data from the data bank 66, since the operating parameters to be set for an optimal harvesting operation also depend on the type of crop processing elements in use and their dimensions. A threshing drum 22 for rice is to be operated with a different rotational speed and a different threshing slot than a threshing drum 22 for cereals, which, in turn, is to be operated with a different rotational speed and a different threshing slot than a threshing drum 22 for corn. These remarks are analogous for the threshing concave 34, the separating basket 36, and the screens 78, 80, which are available in different embodiments. The invention under consideration proposes various procedures to solve the problem of maintaining in the data bank 66 data corresponding to the crop processing elements currently available in the harvesting machine 10 in a simple and in the least possible error-prone manner, and of being able to transfer them to the control unit 62. To this end, the reading device 68 is provided; it reads passive identification elements 86, 86', 86" (or elements provided with a power source), placed on the crop processing elements, and communicates signals to the control unit 62, with the aid of which the control unit 62 can identify the individual crop processing element. The reading device, for example, can hereby identify an article number coded in the identification element 86, 86', 86" and transmit it to the control unit 62. The control unit 62 then reads the data that correspond to the identified crop processing element from the data bank 66. These data can concern dimensions or other mechanical characteristics of the crop processing elements, or operating parameters to be set with specific constellations, or variables dependent thereon, or variables with whose aid the operating parameters can be calculated.

Figure 3:
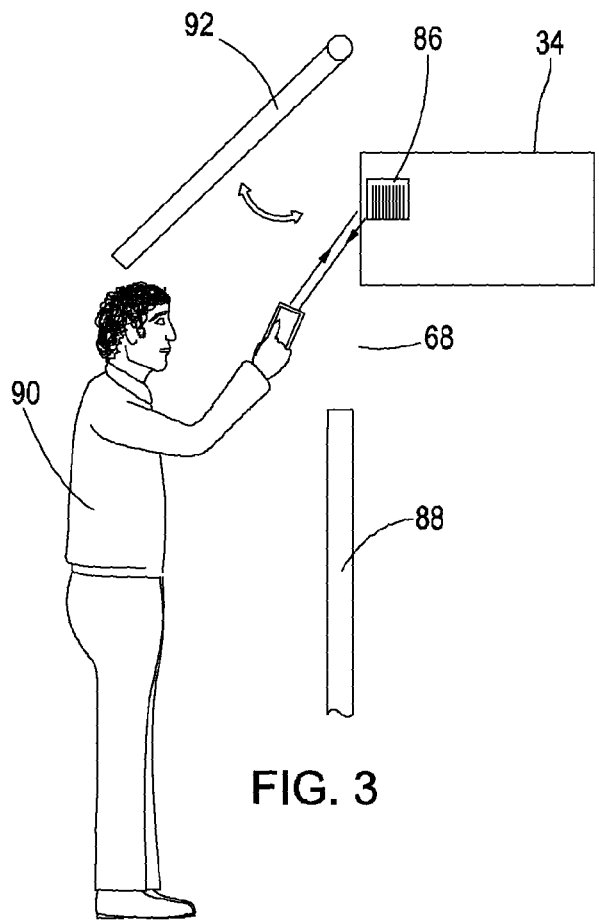
FIG. 3 shows a schematic view of a use of a reading device, according to a first embodiment, when reading an identification element of a crop processing element of the harvesting machine.

A first embodiment of a reading device 68 and an identification element 86 is shown in FIG. 3. The identification element 86 is a label that is stuck on the side of the crop processing element, which, in this case, is the threshing concave 34 with a barcode or QR code clearly identifying the crop processing element, which is read with a reading device 68, designed as a smart phone with a camera that is run with a corresponding program (app). The reading device 68 then uses wireless communication, via an arbitrary protocol (for example, WLAN or a telephone protocol) with the control unit 62, so as to send an identified article number of the threshing concave 34. The access to the crop processing element takes place here through a swiveling flap 92 of the outer shell 88 of the harvesting machine 10, by means of which an operator 90 obtains access to the identification element 86. The reading process shown in FIG. 3 is then carried out especially when a crop processing element has been replaced, either by a type for a different crop or a newer version of the crop processing element. The operator 90 can then be reminded of the reading process every time he closes the flap 92, in particular, by a display device of the operator interface 64. Instead of or in addition to an optical recognition, it would also be conceivable for the communication to take place between the reading device 68 and the identification element 86 electromagnetically, in particular, via close-range communication, wherein the identification element is then (also) identified via an RFID chip.

The smart phone used as a reading device 68 can also be used to directly display information regarding the crop processing element on the display device of the smart phone, which information is recalled with the aid of the identification element 86 from the storage unit of the smart phone (or via a wireless line from a remote site, in particular, from the manufacturer of the crop processing element), for example, the part number, the bundle number, a description, and intended usage areas, advantages of the crop processing element, and/or a list of compatible options. Also, a search possibility for other compatible options corresponding to the individual demands or a possibility to order the crop processing element online or to be shown incorporation instructions may be given.

Figure 4:
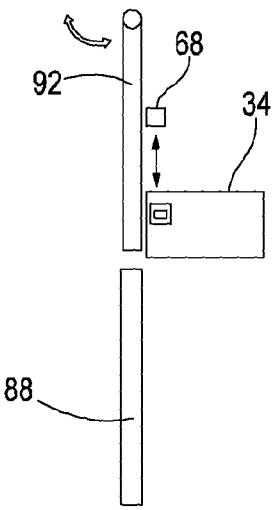
FIG. 4 shows a schematic view of a second embodiment of a reading device in the harvesting machine.

In the second embodiment according to FIG. 4, the identification element 86' is designed as an RFID chip and the reading device 68 is affixed to the inside of the outer shell 88 (here on the flap 92). The reading device 68 communicates via a cable, for example, the machine bus, or has wireless communication with the control unit 62. In this embodiment, the reading device 68 can work together via close-range communication with the identification element 86' and other identification elements placed in the vicinity (not shown), which are placed on the separating basket 36 and/or on the threshing drum 22, or the latter are assigned their own reading devices (not shown). Another reading device (not shown) could then be placed in the vicinity of the cleaning device 46 so as to determine identification elements of the upper screen 78 and the lower screen 80. A unique identification, for example, the article number of the crop processing element, is stored in the RFID chip of the identification element 86'; it is determined by the reading device 68. Here, the reading of the identification element 86' is performed after each closing of the flap 92. An advantage in comparison to the first embodiment is that the operator need not do anything.

Figure 5:
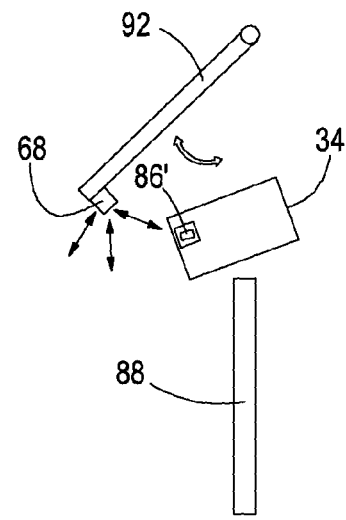
FIG. 5 shows a schematic view of a third embodiment of a reading device in the harvesting machine.

Also in the third embodiment according to FIG. 5, the identification element 86" is designed as an RFID chip and the reading device 68 is affixed to the inside of the outer shell 88 (here, on the flap 92). The reading device 68 communicates via a cable, for example, the machine bus, or communicates wirelessly with the control unit 62. The reading device 68 is preferably sensitive in a zone which, if possible, is oriented downward and only to a limited extent toward the harvesting machine 10, so as to reduce or avoid disturbances caused by reflections on metal parts of the harvesting machine 10.

In this embodiment, the reading device 68 is set up to recognize whether the crop processing element (in the example, especially the threshing concave 34) is dismantled from the harvesting machine or incorporated into it, for which purpose, in particular, the chronologically changing signal strengths of the identification element 86" are used. A unique identification, for example, the article number of the crop processing element, is stored in the RFID chip of the identification element 86"; it is determined by the reading device 68. The reading device 68 thus makes it possible for the control unit 62 to have a current inventory list of the crop processing devices of the harvesting machine. Another reading device (not shown) could be placed in the vicinity of a flap of the cleaning device 46 in order to determine the identification elements of the upper screen 78 and the lower screen 80 during dismantling and incorporation.

In this embodiment, therefore, the surroundings of the harvesting machine 10 are monitored for entering and exiting identification elements 86" so as to keep the inventory list of the control unit 62 of the harvesting machine 10 current concerning the crop processing devices. The reading device 68 here is preferably only active if the flap 92 is opened and/or a person recognized by means of a motion sensor (not shown) is found in its sensitive area.

It should also be noted that the first embodiment could be combined with the second or third embodiment so as to reduce the error possibilities. The crop processing elements were thereby to be provided with identification elements 86 and 86' or 86". The reading device 68 of FIG. 3 can then read both identification elements 86 and 86' or 86", in addition to the reading device of FIG. 4 or 5, which only reads the identification 86' or 86".

What is claimed is:

1. An agricultural harvesting machine comprising
at least one exchangeable crop processing element installed in the interior of the harvesting machine and available in different variants;
an electronic control unit connected with a data bank having data concerning the crop processing element incorporated into the interior of the harvesting machine, wherein the control unit is set up to produce output signals based on the data; and
a reading device connected with the control unit to interact with at least one identification element placed on the crop processing element and to transmit an output signal to the control unit that clearly identifies the crop processing element during or after the incorporation of a crop processing element into the harvesting machine with the aid of the signal, the control unit updating the data bank in response to receipt of the output signal.

2. The agricultural harvesting machine according to claim 1, wherein the control unit is set up to monitor the operating state of the harvesting machine and is used for the automatic adjustment of an operating parameter of the harvesting machine, the control unit being connected with at least one sensor for determination of at least one of the following:
- an operating value of the harvesting machine;
- a crop characteristic; or
- a result of a crop processing activity taking place in the harvesting machine;
- said harvesting machine being operable on the basis of the data and the signals of said at least one sensor, to produce monitoring signals with regard to the operating state of the harvesting machine and control signals for the adjustment of an operating parameter of the harvesting machine.

3. The agricultural harvesting machine according to claim 1, wherein said at least one identification element comprises a label with an optically identifiable marking and the reading device works optically.

4. The agricultural harvesting machine according to claim 1, wherein the identification element comprises an electromagnetically readable data carrier, and the reading device works electromagnetically.

5. The agricultural harvesting machine according to claim 1, wherein the reading device is made for handheld operation.

6. The agricultural harvesting machine according to claim 1, wherein the reading device is affixed in the area of an opening of an outer shell of the harvesting machine, through which the crop processing element can be dismantled from the harvesting machine and incorporated into it.

7. The agricultural harvesting machine according to claim 1, wherein the reading device is affixed within an outer shell of the harvesting machine.

8. The agricultural harvesting machine according to claim 1, wherein the reading device is adapted to recognize whether a crop processing element is brought to the agricultural harvesting machine or removed from it.

9. The agricultural harvesting machine according to claim 1 the control unit being adapted to identify the type of at least one of the following: a threshing concave, a separating basket, a cleaning screen, a straw chopper or a straw spreader.

* * * * *